United States Patent [19]
Mohr et al.

[11] 3,883,196
[45] May 13, 1975

[54] END PANEL SUPPORT SYSTEM

[75] Inventors: Robert G. Mohr, Grand Rapids; Ronald R. Hodges, Granville; Jack Hockenberry; Douglas Scheerhorn, both of Grand Rapids; Gale F. Wilcox, Wayland, all of Mich.

[73] Assignee: Steelcase Inc., Grand Rapids, Mich.

[22] Filed: Oct. 11, 1974

[21] Appl. No.: 514,062

Related U.S. Application Data

[62] Division of Ser. No. 366,218, June 1, 1973.

[52] U.S. Cl. ............... 312/194; 312/111; 312/14 D; 312/195; 312/257 R; 312/257 A
[51] Int. Cl.. A47b 17/00; A47b 19/00; A47b 43/00
[58] Field of Search ............ 312/111, 140, 194–203, 312/223, 257 R, 257 SK, 257 SM, 257 A; 108/23

[56] References Cited
UNITED STATES PATENTS

| | | | |
|---|---|---|---|
| 1,786,823 | 12/1930 | Carrington et al. | 312/223 R |
| 1,873,932 | 8/1932 | Hunter | 312/195 |
| 2,071,865 | 2/1937 | Parsons | 52/484 R |
| 2,179,307 | 11/1939 | Sywert | 312/257 A |
| 2,233,003 | 2/1941 | Epps | 312/195 |
| 2,380,379 | 7/1945 | Attwood | 312/257 R |
| 2,527,226 | 10/1950 | Levine | 312/257 A |
| 2,933,360 | 4/1960 | Sitler | 312/195 |
| 3,000,682 | 9/1961 | Loew et al. | 312/194 |
| 3,241,885 | 3/1966 | Deaton | 312/257 R |
| 3,346,311 | 10/1967 | Bears | 312/257 R |
| 3,550,891 | 11/1970 | Cohen | 312/198 |
| 3,635,174 | 1/1972 | Ball et al. | 108/23 |
| 3,676,974 | 7/1972 | Daly | 52/221 |

*Primary Examiner*—Paul R. Gilliam
*Assistant Examiner*—Victor N. Sakran
*Attorney, Agent, or Firm*—Price, Heneveld, Huizenga & Cooper

[57] ABSTRACT

A furniture construction system wherein standardized 5 inch modular components are supported between special end panels. Cover members positioned over the end panels are provided with special releasable fastening means whereby the covers may be readily removed to provide access to the fastening mechanisms utilized to fix the panels and supported components, as desks, tables, and the like, together.

3 Claims, 22 Drawing Figures

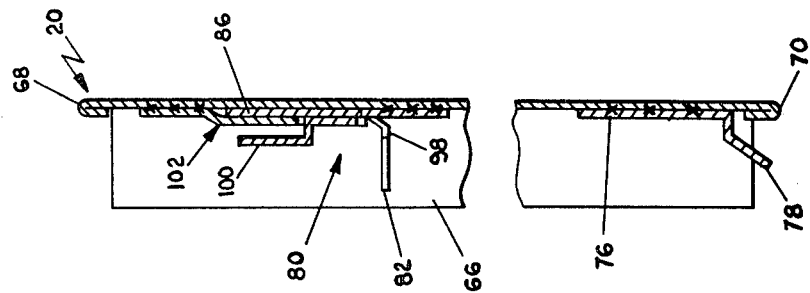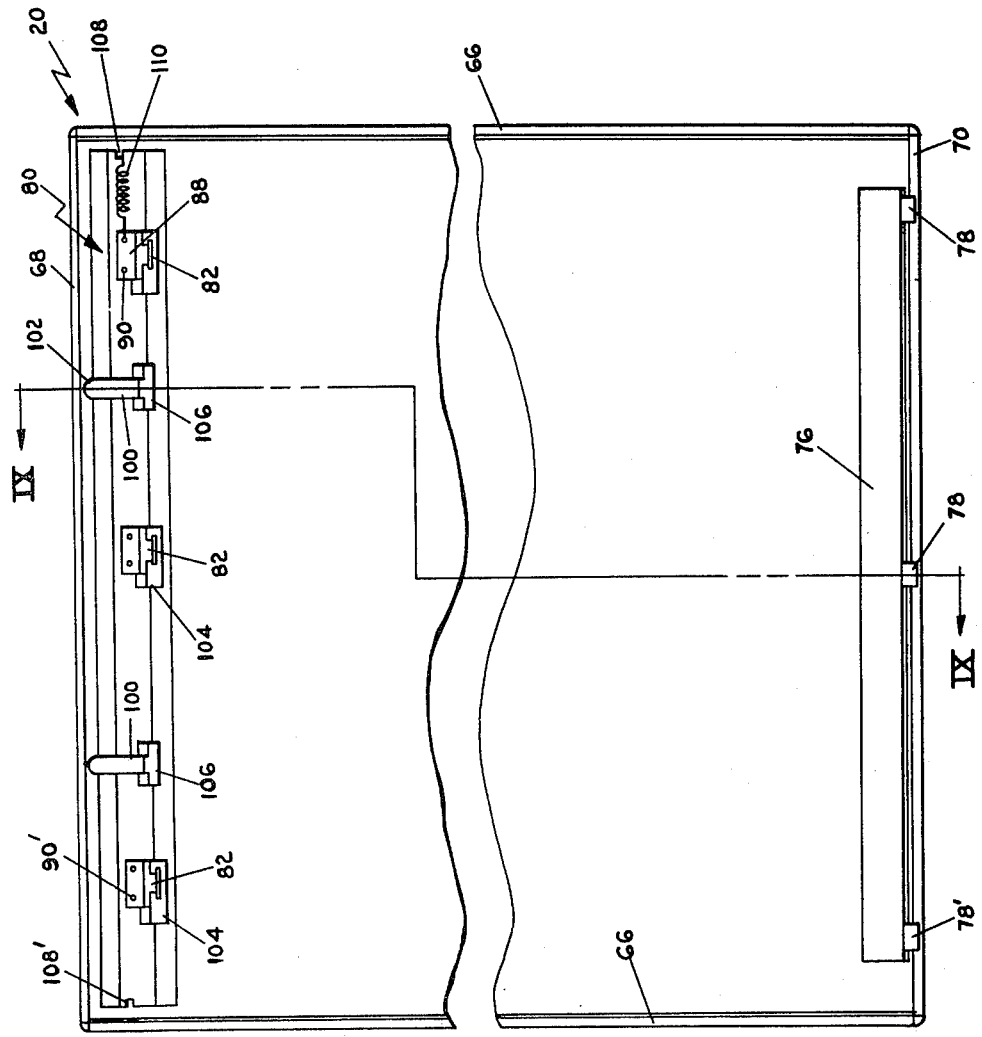

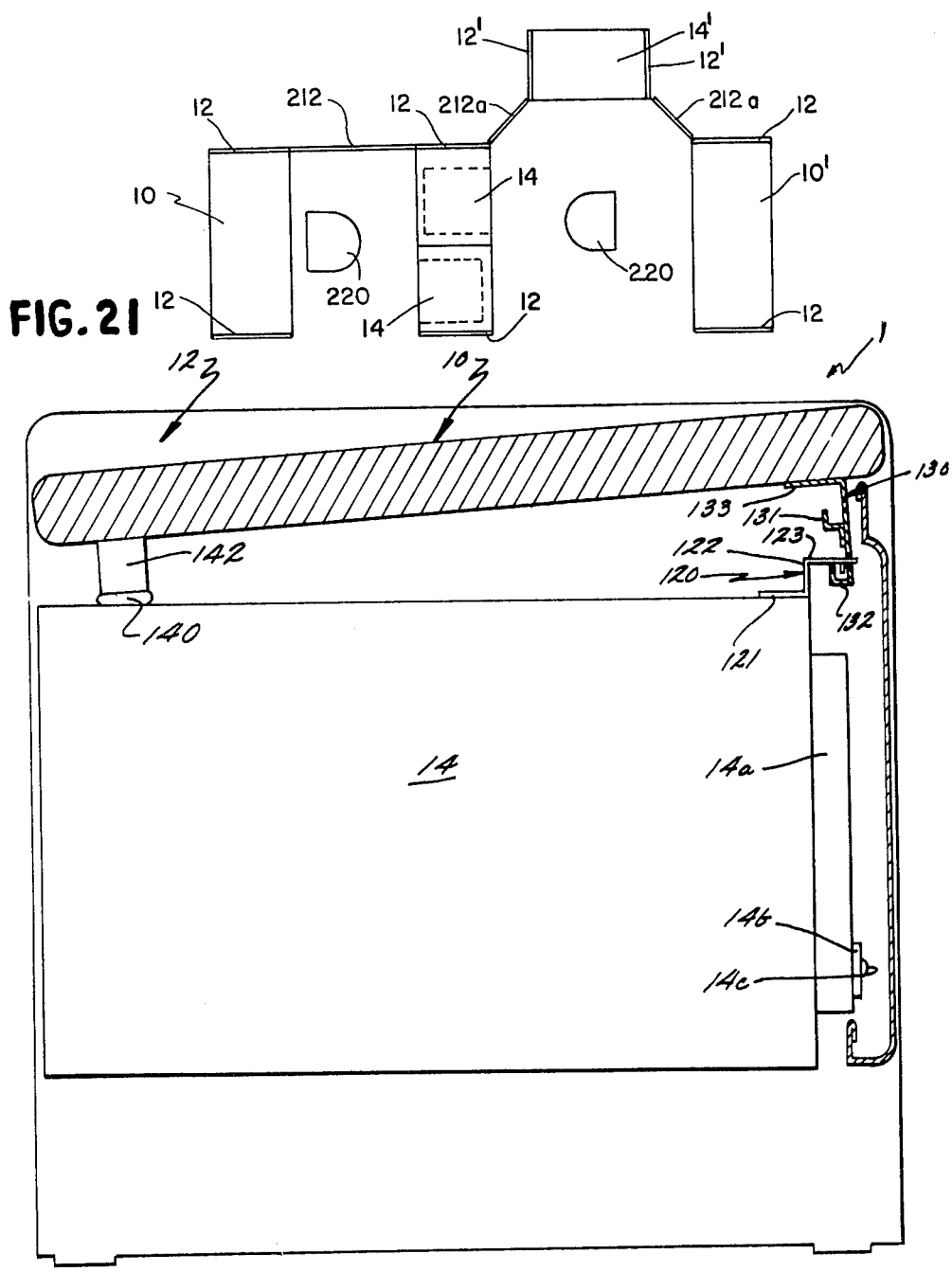

END PANEL SUPPORT SYSTEM

CROSS REFERENCE TO RELATED APPLICATION

This is a division of application Ser. No. 366,218, filed June 1, 1973.

BACKGROUND OF THE INVENTION

This invention relates to furniture construction, particularly to office furniture as desks, tables, bookshelves, credenzas and the like. It is particularly concerned with complete systems of such furniture, disigned to divide substantial areas of work space and provide individual work stations.

Extensive steps have been taken to modularize such systems and a large number of such modular systems are now available on the market. These systems include wall panels which may be erected at any point in a large area and which include means for hanging various components such as shelves, filing cabinets, writing surfaces or the like from the wall panels. Desks and side units for use in conjunction with such wall panels are furnished separately and are not typically mounted to the wall panels. Thus, these systems are modular only with respect to units which are to be hung on the wall panels. Typically, such systems are somewhat expensive in that the wall panels utilized are an additional expense over and above the cost of the units to be hung thereon. Further, such systems suffer the drawback that not every user wants the closed in effect which is achieved by using such wall panels.

Yet another drawback to such systems is that none of them are dimensionally modular. While the desks for the system may be dimensionally modular, for example 30 inches by 60 inches, or 30 inches by 72 inches, the side units may have widths of 20 inches. The drawback to such irregular dimensioning is that it becomes difficult to plan the arrangement of the furniture in advance. One must carefully scale the dimensions of each component.

Some systems do approach dimensional modularity based on a 6 inch module. In such a system, each of the length and width dimensions of the components are multiples of 6 inches. The reason for this reliance on the 6 inch module is that for years, buildings have been constructed based upon the 12 inch unit. Office furniture manufacturers have followed suit and have based their desks, constructions and the like on 6 inch units. This has been traditional for years and years. One drawback is that it is difficult to provide an overall system based on this "6 inch" unit. A filing cabinet, for example, must be thoroughly shallow so that is doesn't take up any more floor space than necessary, but must be sufficiently deep that it does not readily tip over forwardly or rearwardly. To be made on a 6 inch module unit, such a storage cabinet must be either 18 inches or 24 inches. Unfortunately, 18 inches is too shallow and 24 inches is too deep. Thus, the high storage unit is typically a unit in a system in which a departure is made from the basic 6 inch module. Thus, no one heretofore has been able to offer a complete office furniture system based on a single basic dimensional unit.

SUMMARY OF THE INVENTION

The present invention provides an office furniture system wherein one or a number of standardized furniture components as desk tops, table tops, cabinets, bookshelves or the like are supported between a pair of parallel end panels. The need to purchase separate wall panels to achieve a modular system is eliminated. Since cabinets, desks and the like require end panels anyway, the present furniture system achieves modularity without requiring a user to purchase a special "extra", i.e. the wall panel. Further, desks, credenzas, tables and other floor supported units are tied into the system automatically, since all are supported on end panels. Finally, one can achieve an open look, if desired, by mounting cabinets above a work surface and providing no back between the work surface and the cabinet.

A supported member, such as a desk top or the like is arranged between a pair of structurally supporting panel members. Means are provided to secure the panels and supported member together in a variety of desirable configurations. Special cover members having locking means therein are also provided and adapted to be releasably secured to the panels to thereby cover the wiring and the mounting mechanisms contained in the end panels. The covers are readily removable, however, so that the fastening means is accessible so that the furniture construction may be conveniently changed to satisfy changing office requirements.

Further modularity is achieved by providing means on a supported top for suspending various pedestals and like units below the top. This allows one to use the same end panels to make a table, a one pedestal desk, a two pedestal desk or a credenza unit.

Standardized component construction allows maximum flexibility to satisfy the requirements of the various consumers. The unique panel supporting structure allows ease of assembly and modification of the structure when required. The panels additionally provide a convenient arrangement for containing the wires associated with office machines and the like associated with modern-day offices.

It is yet another important aspect of the invention to provide a novel locking mechanism for the covers and end panels, which locking mechanism is readily accessible through a special access closure positioned on the upper surface of the end panels. No special tools are required to release the locking mechanism and remove the end panels and additionally, the closure member may be also utilized to provide a wire access opening at the top of the furniture structure.

The panels are constructed in a manner to provide rigidity and simultaneously to provide channel means through which wiring for telephones, dictating equipment, office machines, and the like may be positioned and hidden from view. The end support panels are of a two-piece construction having one portion thereof which is a generally flat planar section while the other is formed with a dished-out central portion to give the panel rigidity. The peripheral portions of the panel having the dished-out central portion are planar and are secured to the first-mentioned panel sections to thereby provide convenient wiring channels around the dished-out portions.

In yet another aspect of the invention the end panels, tops and various cabinets are constructed so as to have length and width dimensions based on multiples of five inches. Cabinets, including the thickness of end panels, are available in 30 inch, 35 inch and 45 inch dimensions, for example. The first houses letter leter files side by side, the second two legal files side by side and the third three letter files side by side — all with a minimum of wasted space. Significantly, the 45 inch cabinet makes an excellent side credenza since it spaces one's desk 45 inches from a wall or rear storage unit. A 45 inch spacing is the ideal spacing required for a desk chair. Less leaves one somewhat crowded and more results in wasted space.

Similarly, this 5 inch module concept results in work surfaces which are either 20 inches, 25 inches, 30 inches or 35 inches wide, from front to back. This means that the smallest filing cabinets are at least 20 inches deep. This provides ample surface on which to place typewriters or the like and give sound fore and aft stability to taller filing units. Units having an 18 inch width would be too narrow for proper stability while units having a 24 inch width would result in wasted space.

Consequently, a wide range of combinations is achieved merely by providing several different panels having fore to aft widths of 20, 25, 30 and 35 inches. Work surfaces and cabinets have similar fore to aft dimensions and have lengths which, when combined with a pair of end panels, result in units having lengths of 30, 35, 40, 45, 50, 55, 60, 65, 70 and 75 inches. Because of this modular interrelationship, a planner can plan his entire work space using a five-inch scale grid. The chance of error is minimized since all dimensions and combinations of dimensions will either end in zero or 5.

Thus, the present invention provides a furniture system in which one or a number of standardized furniture components as desks, tables, bookcases, credenzas and the like are supported by special end panel members. The structure can be utilized singly, in abutting relationship, stacked back to back, and in virtually limitless numbers of arrangements which can be constructed utilizing the basic modular construction.

These and the many other important advantages of the invention will be further understood and appreciated by those skilled in the art by reference to the following written specification, claims and appended drawings.

BRIEF DESCRIPTION OF THE DRAWINGS

FIG. 8 is an elevational view of the inside of the cover panel removed from the end panels;

FIG. 9 is an enlarged cross-sectional view taken along the plane IX—IX of FIG. 8 illustrating the fastening mechanisms for the cover member;

FIG. 17 is a cross-sectional view similar to FIG. 16 taken along the plane XVII—XVII of FIG. 5 illustrating the pedestal mounting on a desk with a tilted top;

FIG. 21 is a schematic plan view of a furniture arrangement in accordance with the present invention.

DETAILED DESCRIPTION OF THE INVENTION

Figure 1:
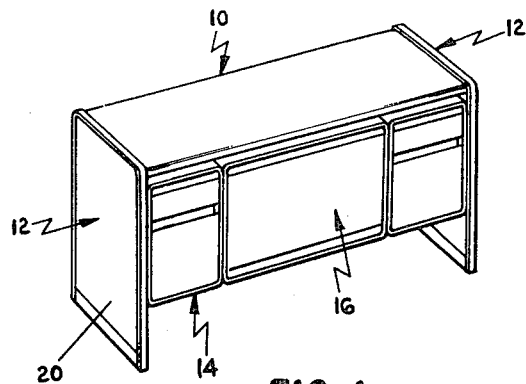
FIGS. 1–5 are perspective views illustrating representative furniture constructions provided in accordance with the invention.
Figure 2:
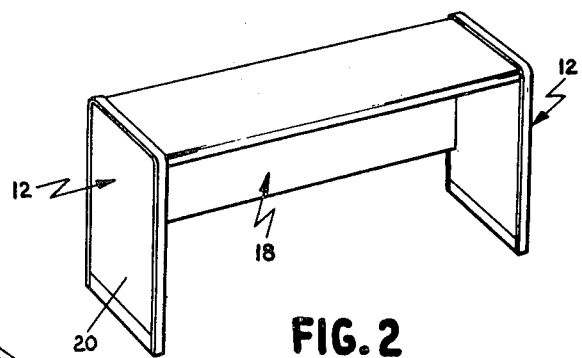
Figure 3:
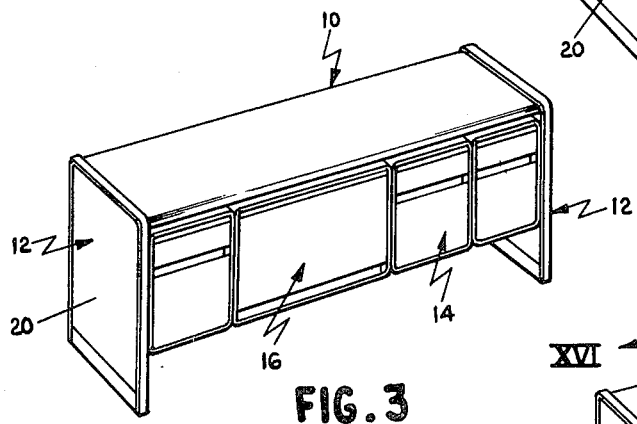
Figure 4:
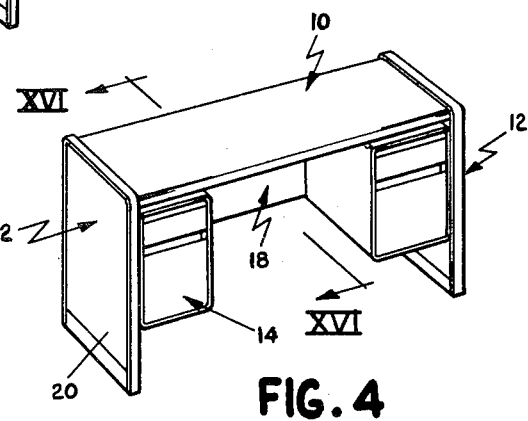
Figure 5:
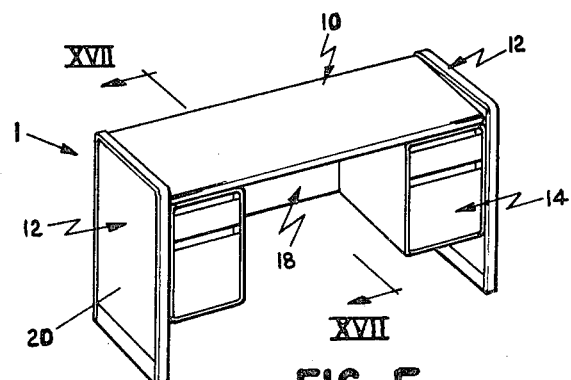

Referring now to FIGS. 1–5, a representative sampling of various unit assemblies constructed in accordance with this invention is illustrated. FIGS. 1 and 3, for example, illustrate credenza unit assemblies incorporating a center case portion with drawer sections positioned on either side thereof. A work table unit is shown in FIG. 2. FIG. 4 illustrates a desk unit assembly having a flat top portion supported by end panels and a pair of drawer sections on either side thereof. FIG. 5 illustrates a desk similar in construction to FIG. 4 wherein the top surface thereof is tilted at an angle. Each of these constructions utilizes the same basic components including a supported member as the top surface generally designated by the numeral 10 in each of FIGS. 1–5; a pair of end panel members 12 adapted to support a supported member; drawer units 14 as shown in FIGS. 1, 3, 4 and 5; credenza center cases 16 shown in FIGS. 1 and 3; and back panels or stretchers 18 as illustrated in FIGS. 2, 4 and 5. A virtually limitless number of arrangements can be constructed from a basic set of components as will become readily understood by those skilled in the art as a detailed description progresses.

The end panel members 12 are in normal use provided with a cover member 20 (see also FIG. 8) which may be readily removed providing access to the interior of the end panels where the means for securing the end panels and the supporting members together are located.

Figure 6:
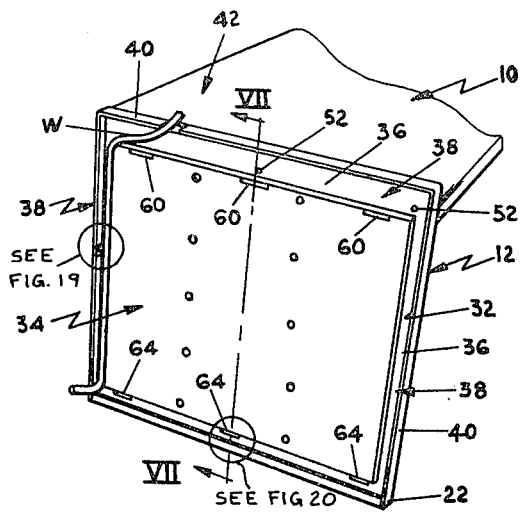
FIG. 6 is a perspective view of the end panel support member with the cover panel removed.
Figure 7:
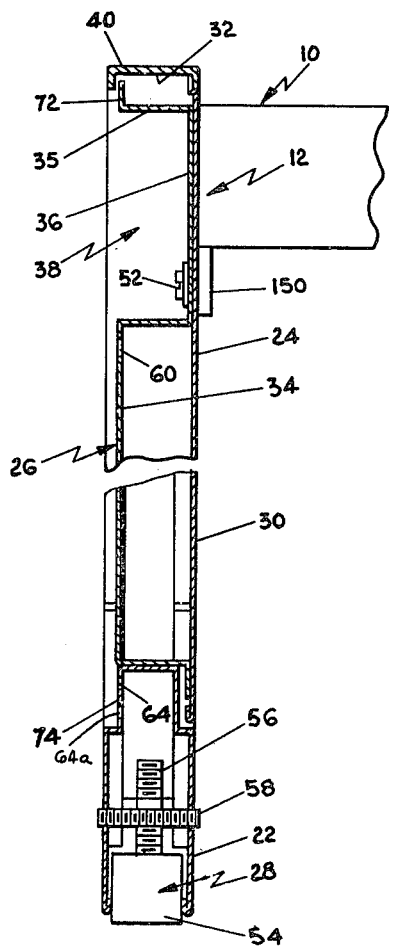
FIG. 7 is a cross-sectional view of the end panel support member taken along the plane VII—VII of FIG. 6.

Referring to FIGS. 6 and 7, end panel 12 is shown with cover 20 removed. End panel 12 is of a double-walled construction and includes a base 22, a sheet metal inner wall 24, and an outer wall 26. The base is an elongated metal channel-like member in which levelers 28 are adjustably mounted as will be more fully described hereinafter. Inner wall 24 has a flat planar back surface 30 bounded at its top and side edges by a peripheral flange 32. Outer wall 26 has an outwardly formed central portion 34, a flat planar surface 36, and an outer flange 35 bounding the central portion adjacent the top and side edges. Outer flange 35 is bent upwardly at the top of end panel 12 and laterally at the sides of end panel 12 to define abutment flanges 72 against which cover panel 20 abuts. The flat surface 36 is welded to inner wall 24 and the lower edge of projecting central portion 34 is welded to base 22 to provide a strong, rigid, double wall end panel structure.

The recessed area formed by flat planar surface 36, outer wall flange 35 and the raised central portion 34 forms a wiring channel 38 about the front, top and back edges of the interior of the end panel. Wiring (W, FIG. 6) utilized for telephone hookups, dictating equipment, and similar office machines is conveniently placed in channel 38 and may be brought out to the top of the work surface.

Figure 11:
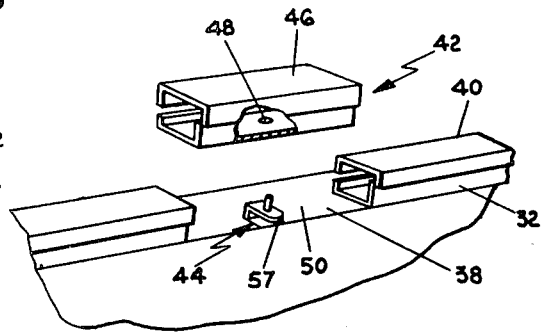
FIG. 11 is a fragmentary exploded view showing the upper access opening in the trim strip surrounding the end panel support member.

A decorative trim strip 40 extends about the front, top and back peripheral surfaces of the end panels to provide an attractive appearance (FIG. 6). Access means 42 is provided on the top surface of the trim strip 40 to allow passage of the wiring from channels 36 to the upper surface of the work surface 10. Trim strip 40 and flange 32 are provided with an access opening 44 (FIG. 11). A plug or cap member 46 constructed to blend with trim 40 is provided to close the access opening. Plug 46 is fixed in position in opening 44 by means of an opening 48 in its lower surface which is releasably engageable with an upstanding pin member 50 fixed in channel 38. Pin member 50 is centrally supported in opening 44 and channel 38 by means of tab 51 secured to and extending outwardly from flat planar surface 36. Alternative plugs 46 are provided. Slots or openings at the top surface of one plug 46 are provided to allow passage of wires or the like to the top of the work surface from the channel 38. For situations where wiring access is not necessary, another plug is provided which has a planar flat top surface blending perfectly with the trim strip to provide a flat flush and continuous appearance. An alternative cover for access opening 44 is disclosed in copending patent application serial number (P445), entitled "ACCESS COVER", filed on even date herewith by Dirk Van Kuik and Gale Wilcox, assigned to the assignee of this application and specifically incorporated herein by reference.

The supported member or work surface 10 is secured to the end panels by means of screws 52 passing through openings provided in outer wall 26 and inner wall 24 into a bracket 54 or other suitable threaded fastener located on the ends of the supported member. Top 10 can be tiltably mounted in the manner set forth in copending application Ser. No. 366,161, the specification of which is incorporated herein by reference, entitled "TILTABLE DESK TOP", filed on even date herewith by Donald Dean Korell and assigned to the assignee of this invention.

Figure 16:
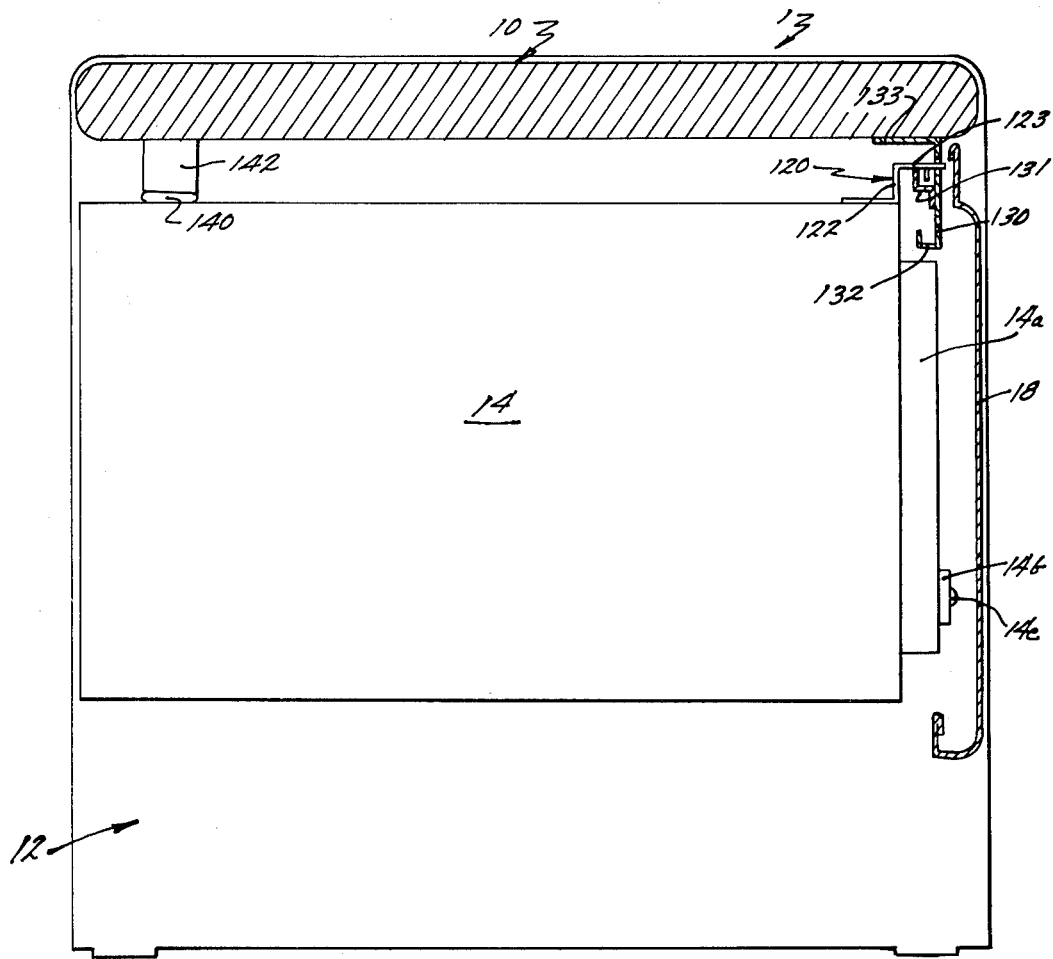
FIG. 16 is a cross-sectional view taken along the plane XVI—XVI of FIG. 4 illustrating the pedestal mounting in a level top desk construction.
Figure 18:
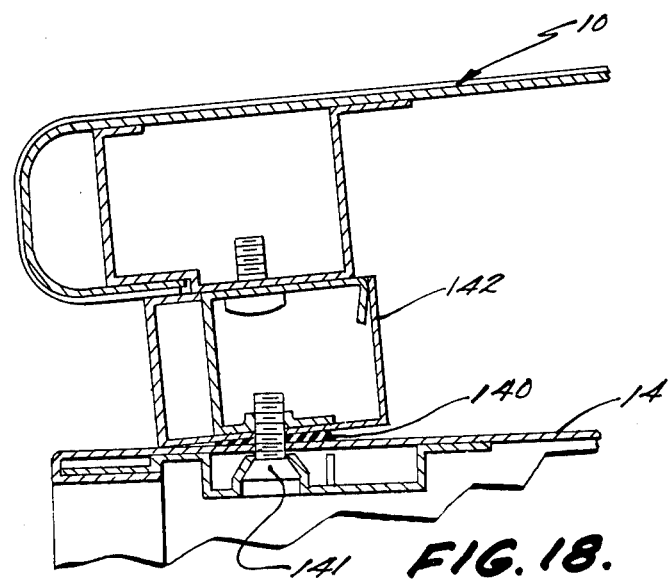
FIG. 18 is an enlarged fragmentary view of the mounting structure for maintaining the pedestal in a level position.

The pedestals or drawer units 14 are suspended at the rear from the top 10 of desk 1 by the interengagement of a hanger 120 and a rail assembly 130 (FIGS. 16, 17 and 18). At its front, pedestal 14 is suspended by a pair of bolts 141, each passing through a resiliently compressible spacer 140 and into a beam 142 of top 10. The interconnection between the end panels 12 of desk 1 and top 10 can be adjusted so that top 10 can be oriented either in a horizontal position (FIG. 16) or in a tilted position (FIG. 17). Rail assembly 130 includes a top rail 131 and a bottom rail 132, and hanger 120 engages top rail 131 when top 10 is horizontal and bottom rail 132 when top 10 is tilted. In this manner, pedestal 14 is generally horizontal regardless of the orientation of top 10. This suspension is more fully described in co-pending application Ser. No. 366,155, entitled "SUSPENDED PEDESTAL DESK", the specification of which is incorporated herein by reference, filed on even date herewith by Donald Dean Korell and assigned to the assignee of this invention.

Figure 12:
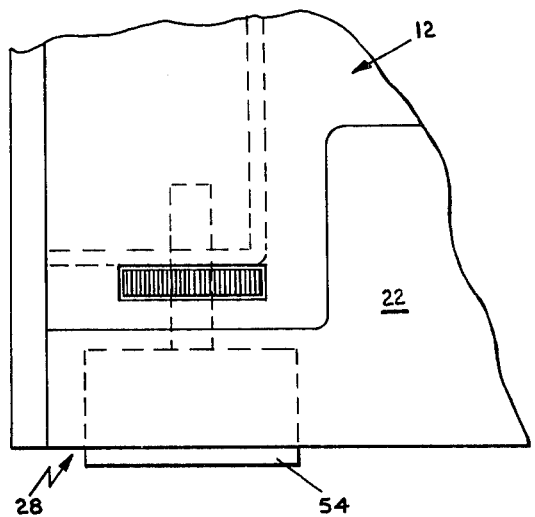
FIG. 12 is a fragmentary plan view illustrating the structure of the leveling mechanisms shown in FIG. 7 and the lower wiring access opening in the trim strip surrounding the end panel support member.

The leveling means 28 located at the bottom of the end panels in base 22 are provided to make leveling adjustments of the assembled unit if required. As shown in FIGS. 7 and 12, levelers 28 include a glide member 54 extendible and retractable from the base 22. A stud 56 is fixed to the glide member and extends upwardly therefrom into the panel between side walls of base 22. A nut is threaded on the stud and is captively held in the base by its abutment with a slot formed therein so that as the nut is turned, the stud and glide member will move with respect thereto to thereby extend or retract glide member 54.

Referring again to FIG. 6, a plurality of slots 60 are formed in the upper edge of the outwardly formed central portion 30 of outer wall 24. At the lower portion of the outer wall, a plurality of slots 64 are also provided to engage the lower portion of cover 20.

The cover assembly and the locking mechanisms therefor are illustrated in FIGS. 3–10 and illustrated in assembled relationship with the end panels in FIG. 15. Cover 20 is formed of sheet metal having height and width dimensions corresponding to the opening in end panels 12. Cover 20 is formed with a pair of extending side flanges 66 adapted to fit inside the peripheral flanges 32 forming wire channels 38 at the front and back surfaces of the end panels. The upper and lower edges of the cover are rolled over as illustrated at 68 and 70 providing a double wall thickness at the top and bottom respectively of the cover. As will be more fully described, the double wall thickness is provided for abutting relationship with corresponding steps 72 and 74 (FIGS. 7 and 15) provided in the end panel structure.

A retainer rail 76 welded to the interior of the cover at the lower portion thereof includes a plurality of retainer tabs 78 extending outwardly from the inside of the cover near the lower edge portion 70. Retainer tabs 78 are spaced along the length of the retainer rails and are provided for engagement with slots 64 (FIGS. 6 and 15) in the end panels.

Figure 10:
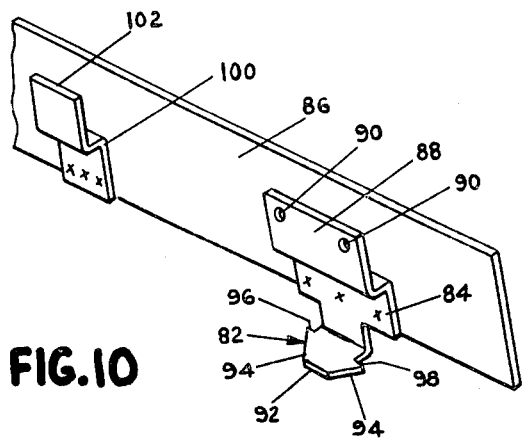
FIG. 10 is an enlarged partial perspective view illustrating the construction of the lock slide mechanism of FIGS. 8–9 in greater detail.

Means for releasably securing the cover to the end panels indicated generally by the numeral 80 is located near the upper edge of the cover. The releasable securing means includes a plurality of lock tabs 82 adapted for locking engagement with tab-receiving slots 60 formed in the central portion of the end panel. As shown in FIG. 10, tabs 82 are formed with a back wall 84 which is secured as by welding to a slidably mounted lock slide member 86. The back wall extends upwardly and outwardly forming an upwardly directed front flange 88 in which a pair of bias spring retainer openings 90 are provided. Each lock tab 82 extends downwardly from the back wall 84 and outwardly perpendicular to the back wall to form the mechanism for engagement with slots 60 in the end panels. Engaging mechanism of lock tab 82 is generally barbed or triangular in shape having a leading edge portion 92, outwardly tapered side walls 94 terminating in shoulders 96 and 98 adjacent its intersection with back wall 84. It will be noted that shoulder 98 extends outwardly from the back wall in greater distance, about onesixteenth of an inch, than shoulder 96 for reasons as will be more fully described hereinafter.

A pair of lock release actuators 100 are also secured to lock slide 86 between lock tabs 82 and each include an outwardly formed upwardly extending upper portion 101 which when assembled in the cover, one or the other of the tab members will be accessible through access opening 42 in the upper portion of the end panels. As shown in FIG. 9, lock slide 86 including lock tabs 82 and lock release actuators 100 are mounted for sliding movement in a lock slide retainer 102. The slide retainer is a generally flat elongated strip having a channel formed in its central portion along its length which receives lock slide 86. Retainer 102 is secured to the inner facing surface of cover 20 as by welding. Openings 104 (FIG. 8) are provided along the length of retainer 102 through which lock tabs 82 extend when assembled. Similar openings 106 are also provided for lock release actuators 100. Notches 108 are provided in the raised center section of the slide retainer at each end thereof and a bias spring 110 is connected at one end in notch 108 and its opposite end is connected through the opening 90 in flange 88 on lock tab 82.

It will be noted that openings 104 in slide retainer 102 are wider than the width of the back wall 84 of lock tab 82. Openings 106 are similarly slightly wider than the width of lock release actuator 100. This allows limited movement of the lock slide 86 and tabs across the width of the cover. Bias spring 110 constantly urges the lock mechanism into its locked position by shifting lock slide 86 to the right as shown in FIG. 8.

Figure 15A:
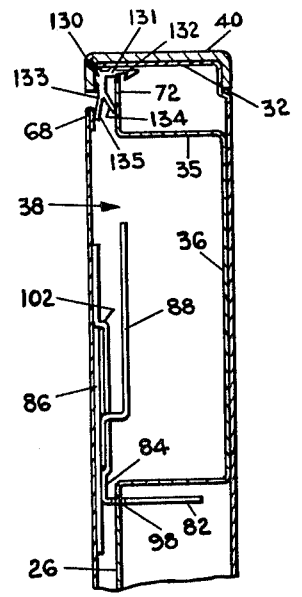
FIG. 15a is a fragmentary cross section illustrating the assembled relationship of the cover member on the end panel.
Figure 15B:
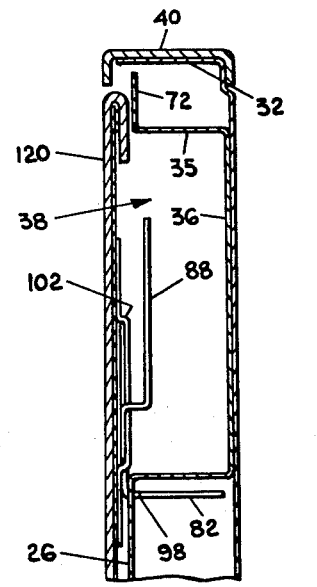
FIG. 15b is the same view as FIG. 15a, except that the cover member is upholstered.

The cover panels 20 may be finished by painting, plating, covering with upholstery material 120 or any variety of methods. The upholstery is placed over the outer surface of the cover panel 20 and is folded over the ends 68 and 70 (FIG. 15b). The releasable securing means is adapted to compensate for different thicknesses of upholstery material or the lack thereof by means of two shoulders 96 and 98 (FIG. 10) provided in the lock tab so that both painted and upholstered surfaces are flush with the edge of trim 40. As mentioned previously, shoulder 98 is positioned a greater distance away from the back wall than shoulder 96. Accordingly, when the cover 20 is upholstered, shoulder 96 is utilized to position cover panel 20 closer to wall 26 of end panel 12 so that outer surface of upholstery is flush with the edge of trim 40 (compare FIGS. 15a and b). When the cover panel 20 is painted or used with a thin fabric, it is desirable to utilize shoulders 98 to serve the locking function so as to allow cover panel 20 to be spaced farther from wall 26 and thereby allow its painted surface to still be flush with the edge of trim 40. In order to insure a snug, rattle free fit when cover panel 20 is not upholstered, a plastic extrusion 130 is employed around the top and side peripheries of end panel 12 (FIG. 15a). Extrusion 130 includes a top barbed leg 131 having a barb 132 on the end thereof. Barbed leg 131 fits inbetween the top edge of flange 72 and peripheral flange 32 of wall 24, and barb 132 holds it there. Leg 133 extends vertically downwardly or inwardly from barbed leg 133 and divides into two diverging spreader legs 134 and 135. These diverging legs hold the edges of cover panel 20 away from the surface of abutment flange 72 to thereby insure a rattle free fit. Of course, when upholstery 120 is used, extrusion 130 is not (See FIG. 15b).

Figure 19:
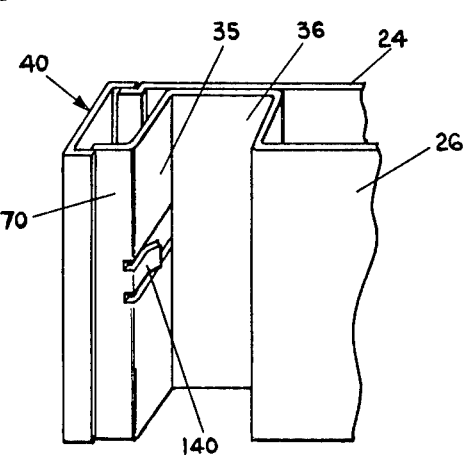
FIG. 19 is a perspective view of that fragmentary portion of an end panel indicated by reference in FIG. 6.
Figure 20:
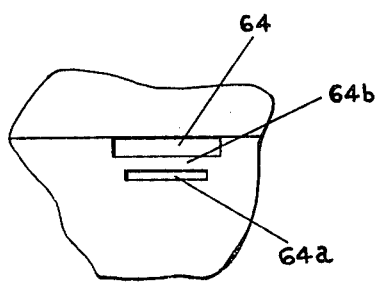
FIG. 20 is an elevational view of that fragmentary portion of an end panel indicated by reference in FIG. 6.

A further snug fit of cover panel 20 to end panel 12 is facilitated by manipulating various adjustment slots and tabs (FIGS. 6, 15a and 15b, 19, and 20). Referring to FIG. 20, it will be noted that in addition to slot 64 at the bottom of end panel 12, there is another smaller slot 64a positioned immediately therebelow. This leaves a small bridge or metal 64b between the two slots. When cover panel 20 is upholstered with upholstery 120, this bridge of metal 64b is bent inwardly by inserting a screwdriver in slot 64a and twisting it. As a result, cover panel 20 is held in closer not only at the top by bridge 96 on tab 82, but also at the bottom by tab 78 (compare FIGS. 15a and 15b). Referring particularly to FIG. 15b, it can be seen that the bridge of metal 64b has been bent inwardly in order to hold tab 78 further inwardly.

Vertical adjustment can also be achieved in a similar manner. Thus, by slipping a screwdriver in slot 64a, holding it horizontally and twisting it, one can force bridge 64b upwardly slightly, either in addition to or rather than inwardly as heretofore described. By doing this at each of the slots 64a, cover panel 20 is moved upwardly higher than would otherwise be the case. To effect downward adjustment, one can slip the screwdriver into slot 64 and force bridge 64b downwardly slightly.

Side-to-side adjustment is achieved by means of a small tab flange 140 cut into peripheral flange 35 of wall 26 at each side of end panel 12 (FIG. 19). These tabs 140 bear against the side flanges 66 of cover panel 20 shown in FIGS. 8 and 9. By bending the tabs 140 inwardly or outwardly, one can shift cover panel 20 from side to side in either direction. In this way, proper lateral adjustment of cover panel 20 is achieved.

Finally, it should be noted that to some extent, in and out adjustment can be achieved at the top of cover panel 20 by prying the edges of slots 60 inwardly or outwardly slightly (FIG. 6). Slots 60 are the slots into which the tabs 82 on slide lock 80 fit.

As shown in FIG. 8, shoulders 98 are adapted for engaging slot 60 because of the presence of bias spring 110 urging the lock slide tabs to the right. To convert for engagement of shoulder 96, bias spring 110 is simply removed from the position as shown in FIG. 8 and placed in the opposite end of the slide retainer in notch 108' and in opening 95 provided in the lock tab at the extreme left of the lock mechanism. When thus positioned, the lock slide and the components mounted thereon will be biased in the opposite direction causing engagement of shoulder 96 with tab-receiving slot 60. Once assembled, the cover may be released by simply removing plug 46 (FIG. 11) and reaching through access means 42 to shift the lock slide by moving lock release actuator 100 against the bias of spring 110. This, of course, causes shifting of the lock tab out of engagement with the slot 60 in the panel to thereby ease in removal of the cover.

Figure 13:
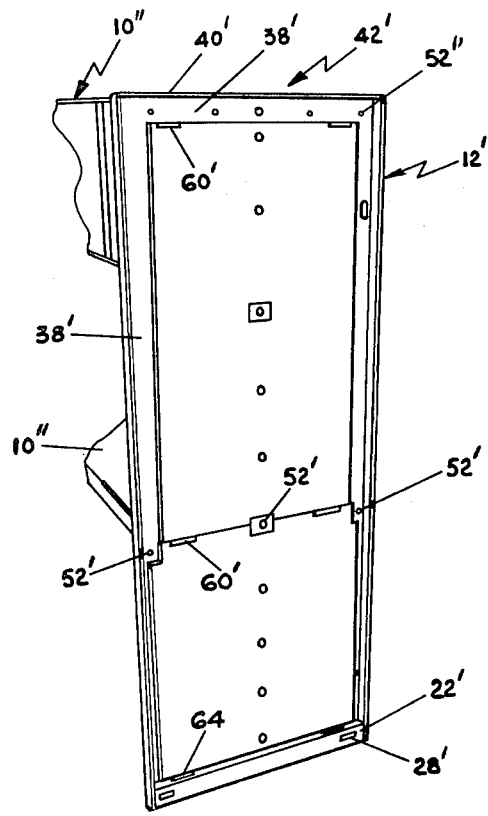
FIG. 13 is a partial perspective view of an alternate structural panel construction.

The alternate embodiment end panel 12' shown in FIG. 13 is similar to that previously described and is constructed in basically the same manner. Like reference numerals bearing the prime (') designation are therefore utilized to identify similar components. The lower section is identical to that previously described including base 22', levelers 28', the double wall construction providing wiring channel 38', and the work surface 10' which is secured by fastening means 52'. The upper section is similarly constructed and supports a storage unit 10" in a similar fashion by fastening means 52". The wiring channels extend upwardly and across the top as the embodiment shown in FIG. 6. Access means 42' is provided at the top thereof in trim strip 40'.

Figure 14:
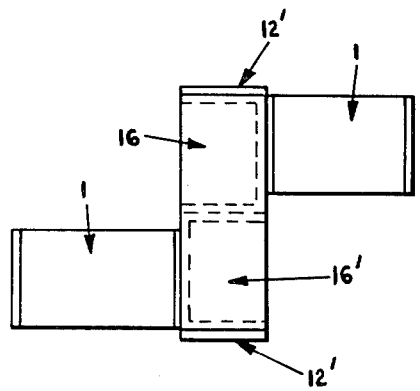
FIG. 14 is a schematic plan illustrating an arrangement of furniture utilizing a combination storage unit, positional with a desk or either side, has two storage modules opening on opposite sides of the unit.

In FIG. 14, the diagram of a shared work station is illustrated wherein end panels 12' of the type shown in FIGS. 6 and 13 are combined to provide the shared storage unit. End panels 12' support a pair of storage units 16 and 16' therebetween. Instead of being suspended from a work surface 10, as for example as shown in FIG. 13, each of the storage units 16 and 16' is adapted for mounting through its end walls to the adjacent unit and to end panel 12' through fastening screws 52". A desk 1, of the type shown in FIG. 5, for example, is positioned on each side of storage units 16, one generally adjacent one unit and one generally adjacent the other. In order that each desk 1 has adjacent storage, storage unit 16 opens to the left to provide access to the desk on the left (as viewed in FIG. 14) and unit 16' opens to the right to provide access to the desk on the right.

It will be realized that virtually any number of furniture constructions can be assembled utilizing the novel support panels of the present invention. In a preferred embodiment, the various component parts are based on modular dimensions of 5 inch modules. It has been found that the 5 inch modular dimension provides a most efficient storage of standard information documents and permits the most efficient arrangement of work stations within good human factors dimensions such as chair space required, desk surface area required and etc, while maintaining modular dimensions which facilitate ease of planning and avoid the necessity of using fractional numbers. It additionally provides better stability for high storage units by using, for example, a twenty inch depth verses the standard eighteen inch depth utilized in conventional office furniture constructions. In addition, a deeper usable reference work area is provided on which office calculators, computer terminals, typewriters, and the like can be placed without inconvenient overhang. Finally, the five inch modular dimension is a rational unit for assisting space planners. As long as feet and inches are used, any module will have to be reduced to inches for calculation. The five inch module reduces the chance of error because all dimensions will end in "0" or "5" which numbers are easy to work with and are convertible to feet and inches as a final calculation.

Thus, the end panels for the present system are provided with depth (the distance from one side edge of the end panel to the other side edge) which are whole number multiples of five inches. Specifically, end panels 12 are provided with depths of 20, 25, 30 and 35 inches. On the other hand, storage units, such as units 14, and tops, such as tops 10, are provided with lengths which, when combined with the thicknesses of two end panels 12, yield a total length which is a whole number multiple of five inches. Specifically, lengths of 30, 35, 40, 45, 50, 55, 60, 65, 70 and 75 inches are provided for. This means that where the desk length is to be 70 inches, for example, and where the thickness of each end panel is approximately 1 inch, the length of the top 10 must be 68 inches. The 68 inch top plus the two 1-inch end panels yields a total length of 70 inches.

The 5 inch modularity concept has been extended to space divider panels which are used in conjunction with the system. These space divider panels are designed to have an appearance identical to or compatible with the appearance of panels 12, but they are constructed with a means for connecting them to end panels 12 and to each other, and they need not include any means for mounting desk tops or the like.

FIG. 21 discloses a furniture arrangement in which one such space divider 212 and two smaller space dividers 212a are employed. Space divider panel 212 is 45 inches in depth, i.e. from one side edge to the other side edge. Space divider 212 joins a desk unit 10 to a storage unit having two storage compartments 14 mounted between a pair of end panels 12. The 45 inch dimension provides for comfortable space in which the occupant of this area can move his chair 220. Also, it provides desired privacy.

The smaller partitions 212a are only 20 inches in depth. Here, a 45 inch storage unit 14' is used as the primary spacer between the desk 10' and the storage units 14. The small divider partitions 212a provide somewhat more space for the occupant of this work area and also provide a nice decorative effect. By providing space divider partitions having depths which are whole number multiples of 5 inches, specifically which are 20, 25, 30, 35, 40 and 45 inches, one continues the 5-inch modularity concept conveniently from the dimensions of the furniture to the dimensions utilized in space division.

In the foregoing description, it will be readily appreciated by those skilled in the art that many modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. A system for supporting one or a number of standardized furniture components as desks, tops, cabinets or the like comprising: a supported member; end panel members adapted to support said supported member; first securing means in said end panels and said supported member for releasably securing same together; cover members for said end panels; and second securing means in said cover members and said end panels for releasably securing said cover to said panel whereby said cover members can be readily removed for access to said securing means; said second securing means includes tabs on said cover members and first slots on said end panel for receiving said tabs, said tabs including engaging means for holding said tabs in place in said first slots, a second slot adjacent and below each said first slot thereby defining a bridge between each of said first and second slots, said bridge being of a bendable material whereby it can be bent in or out, up or down by inserting a tool into an appropriate one of said first and second slots and operating said tool against said bridge, said bridge thereby forming a means for adjusting said cover member in or out, up or down with respect to said end panel.

2. The system of claim 1 in which said cover member includes a rearwardly projecting side flange at either side thereof; said end panel including a channel at each side thereof for receiving said side flanges with each side flange adjacent a channel wall; said channel wall including a tab therein made of a bendable material whereby said tab can be bent either inwardly or outwardly, said tabs bearing against said side flanges to thereby provide a means for adjusting said cover member from side to side.

3. A system for supporting one or a number of standardized furniture components as desks, tops, cabinets or the like comprising: a supported member; end panel members adapted to support said supported member; first securing means in said end panels and said supported member for releasably securing same together; cover members for said end panels; and second securing means in said cover members and said end panels for releasably securing said cover to said panel whereby said cover members can be readily removed for access to said securing means; said cover member includes a rearwardly projecting side flange at either side thereof; said end panel including a channel at each side therefor receiving said side flanges with each side flanges adjacent a channel wall; said channel wall including a tab therein made of a bendable material whereby said tab can be bent either inwardly or outwardly, said tabs bearing against said side flanges to thereby provide a means for adjusting said cover member from side to side.

* * * * *